Patented Mar. 29, 1932

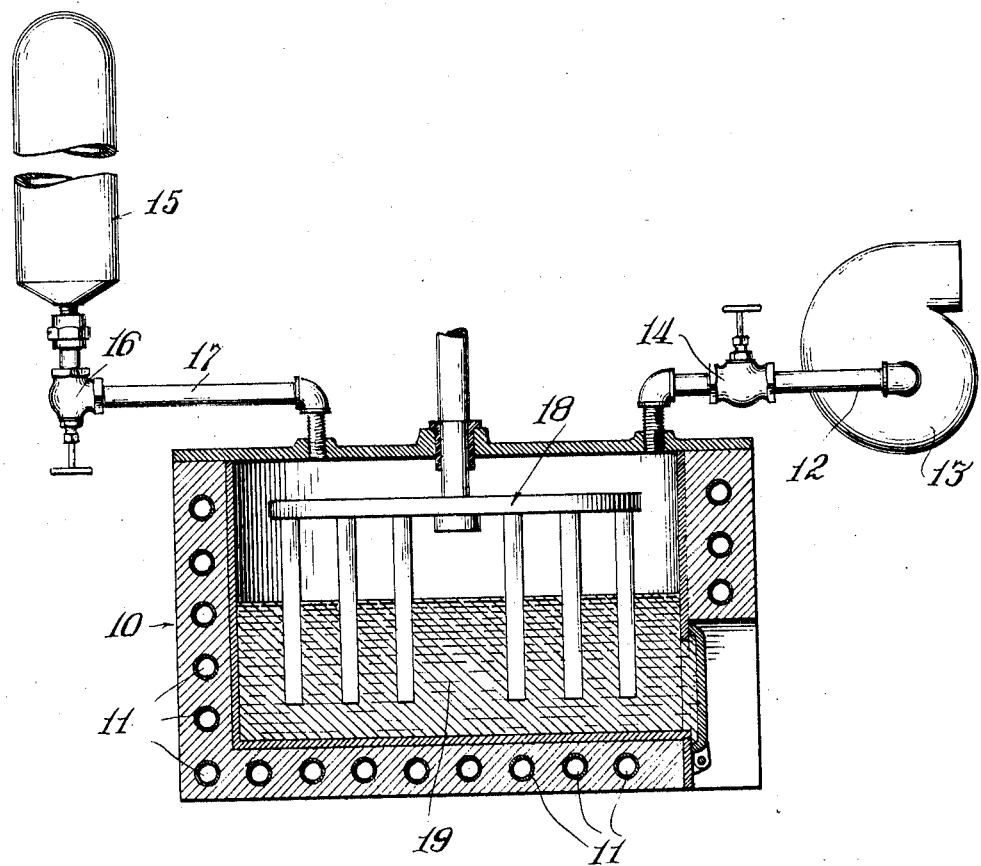

1,851,749

UNITED STATES PATENT OFFICE

CARL BERGQUIST, OF NEW YORK, N. Y., ASSIGNOR TO INTERNATIONAL PATENTS DEVELOPMENT COMPANY, OF WILMINGTON, DELAWARE, A CORPORATION OF DELAWARE

MODIFIED STARCHES AND METHOD OF MAKING SAME

Application filed August 3, 1927. Serial No. 210,325.

My invention relates to the treatment of starch for the manufacture of a series of products ranging from thin boiling starch to high soluble dextrine, which series of products will be referred to, for the want of a better generic term, as "modified starches". Ordinarily the first products of this series, the low soluble or thin boiling starches have been made by heating starch in water in the presence of an acid. The products having higher solubility, the dextrines, have been produced heretofore by roasting dry starch moistened with small quantities of acid. In all cases the acid, hydrochloric acid or nitric acid, for example, acts catalytically to hydrolyze the starch. The starch does not take up the acid.

The present invention is based upon the discovery that a series of products corresponding to the hydrolyzed starch products just mentioned, but with improved properties, can be made by the treatment of dry starch with chlorine gas and heat. By varying the temperature of treatment, the length of the treatment, which may vary from one to twelve hours and the amount of chlorine used, it is possible to produce any modified starch product ranging from thin boiling starch, substantially insoluble in cold water (1% soluble) to dextrines having solubilities in cold water of over 99%. The precise action of the chlorine on the starch is not understood but it is different, at least, from the action of the usual hydrolyzing acid in that it is taken up into the starch and does not act merely as a contact substance. Apparently an actual chemical reaction takes place between the chlorine and the starch or some constituent thereof. Moreover, the chlorine made products have certain different and advantageous properties. The higher soluble dextrines made by the present process will be whiter than dextrines of like solubility produced by the old method of roasting in the presence of an acid. Thin boiling starches manufactured as hereinafter described cook up to a smooth paste. This paste cooked with a proper proportion of water will have a heavy consistency but will nevertheless flow. On cooling it retains its fluid consistency and does not set to a jelly as thin boiling starch made by the old methods. On drying the thin boiling starch made by the present method forms a bright, flexible film.

A mixture of one part starch to four of water, by weight, will give something between a liquid and a jelly that is more unctuous and has better spreading value than the pastes made from the thin boiling starches heretofore known.

Any suitable apparatus may be used for practicing the present process. I have shown in the accompanying drawing a dextrinizing machine of known construction modified slightly for the purpose of the present invention.

The drawing is a vertical sectional view of the apparatus with parts in elevation.

Referring to the drawing, 10 is a vessel in the walls and bottom of which are arranged steam pipes 11 for the purpose of heating the contents of the vessel.

Air dry starch will ordinarily contain twelve or thirteen per cent of moisture. It is important in carrying out my process that this moisture be removed at least to a very large extent. In carrying out the process of my present invention the starch is preferably dried before it is put into the dextrinizing vessel so that it will have a moisture content not substantially in excess of 2%. If desired, the drying can take place in the dextrinizing vessel from which the vapors are withdrawn through pipe 12 by fan 13. If this is the procedure the fan will be stopped and the valve 14 in pipe 12 closed before the chlorine is introduced into the vessel. The chlorine is indicated as contained in the cylinder 15, liquid chlorine being preferably used as a matter of convenience. When valve 16 is opened the chlorine passes through pipe 17 into the vessel 10 which contains a revoluble agitator 18 operating in the body of starch 19. Steam is circulated through the pipes 11.

The treatment to which the starch is subjected depends upon the character of the product desired.

For thin boiling starch having a minimum solubility, say 2% soluble, the quantity of chlorine may be 0.03% to 0.06% of the starch by weight, depending on the quality of the starch as to fluidity, the thicker starch (when mixed with the standard amount of water) requiring more chlorine. The material may be kept at a temperature of 115° C. to 135° C. for two hours at least. With the same quality of starch if the chlorine is increased, the time may be shortened.

At the other end of the range of products producible in accordance with the present invention, a high soluble white dextrine, that is a dextrine having a solubility of 99%, may be produced by the use of from 0.06% to 0.12% of chlorine with the temperature maintained at from 115° to 135° C. for two hours or more.

The reaction does not take place satisfactorily if the temperature is substantially below 115° C. At lower temperatures the paste has a tendency to be turbid and on drying does not give a bright film. If the temperature be substantially above 135° C. there is a tendency for the material to become brown in the converter.

To a certain extent in the production of any desired product, one factor in the treatment can be varied by varying the other factors. That is, if more chlorine is used the temperature may be lower or the treatment less prolonged and vice versa.

When the modification or conversion has been completed valve 16 is closed and the chlorine vapors withdrawn from the dextrinizing vessel by the fan 13.

The products produced by the invention as above described, generally speaking, correspond to the products heretofore made by methods of acid hydrolysis, but have certain improved characteristics as has been noted above. The acidity of the products will ordinarily be the same as in the case of the acid hydrolysis methods, that is the product will have an acidity of approximately pH=4.0.

My invention is not to be considered as limited to the use of any particular form of apparatus. Modifications in the process itself may be made without departure from the principles of the invention, and therefore I wish to be understood as desiring to cover by patent all variations in matters of detail within the scope of the appended claims.

I claim:

1. Method of manufacturing modified starches which consists in heating starch having a moisture content of not substantially more than 2% by weight in the presence of chlorine gas.

2. Method of manufacturing modified starches which consists in heating dried starch to a temperature ranging from 115° C. to 135° C. in the presence of chlorine gas in proportion by weight of from 0.03% to 0.1% of the starch according to the type of product required.

3. Method of manufacturing modified starches which consists in heating starch having a moisture content of not substantially more than 2% by weight to temperatures ranging from 115° C. to 135° C. in the presence of chlorine gas in the proportion by weight of from 0.03% to 0.1% of the starch and continuing the treatment from one to twelve hours according to the type of product required.

CARL BERGQUIST.